Oct. 6, 1964     W. R. BENK     3,151,703
TRANSMISSION
Filed Jan. 2, 1962
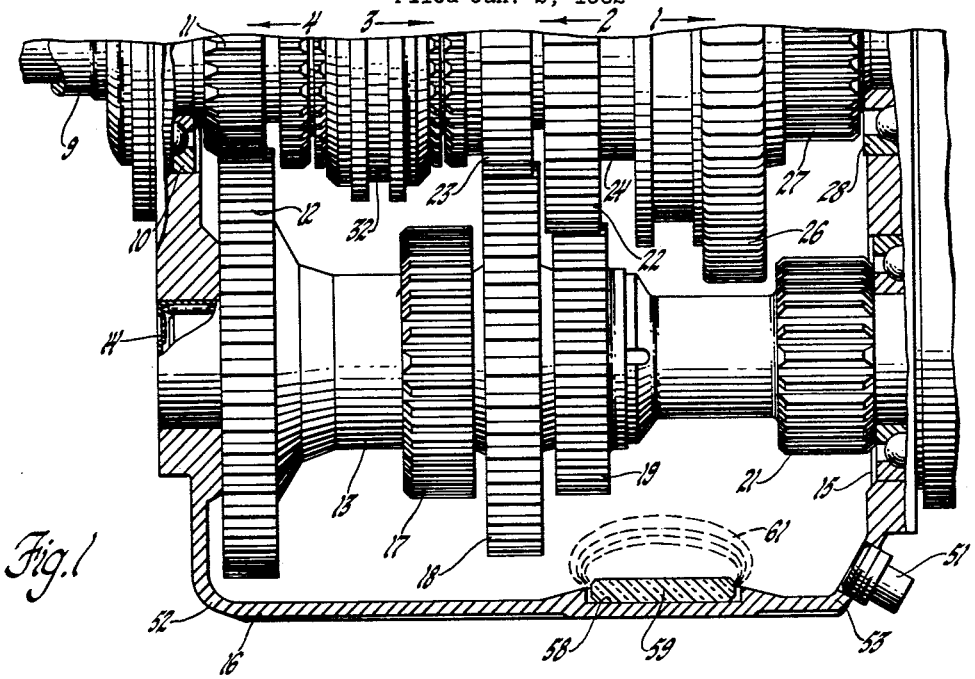
Fig.1
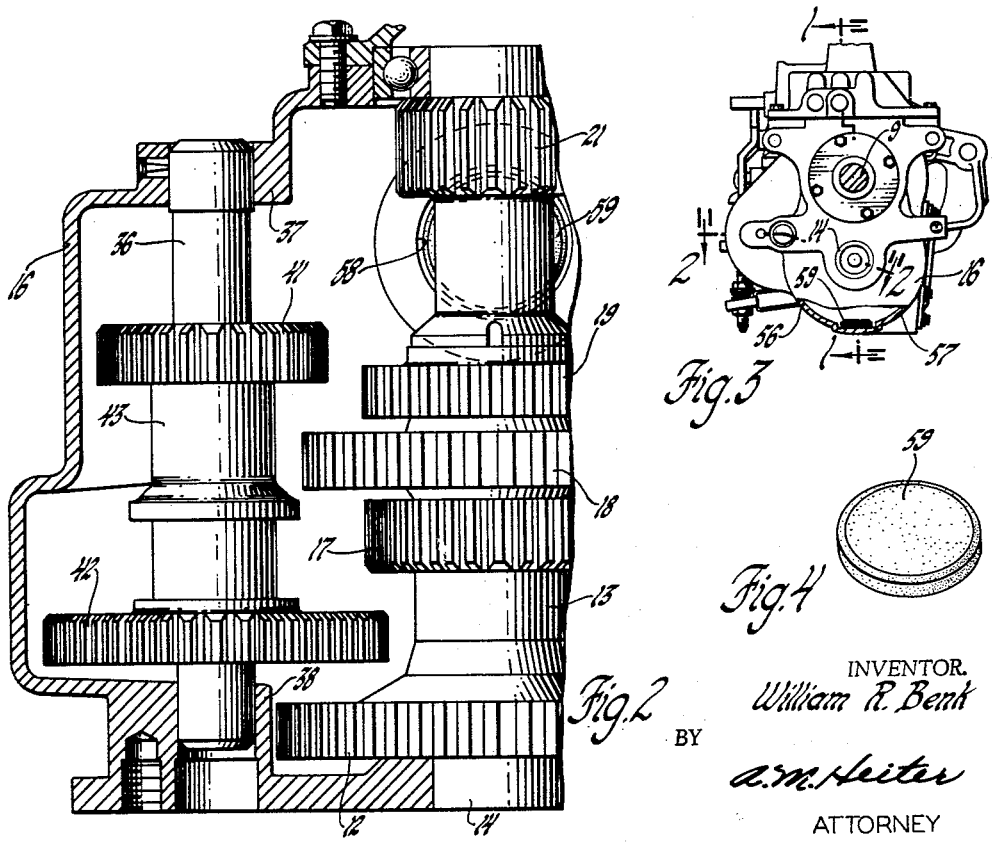
Fig.2
Fig.3
Fig.4
INVENTOR.
William R. Benk
BY
*a.m.Heiter*
ATTORNEY

United States Patent Office 3,151,703
Patented Oct. 6, 1964

3,151,703
TRANSMISSION
William R. Benk, West Bloomfield, Mich., assignor to General Motors Corporation, Detroit, Mich., a corporation of Delaware
Filed Jan. 2, 1962, Ser. No. 163,542
18 Claims. (Cl. 184—6)

This invention relates to transmissions and more particularly to a transmission lubrication arrangement employing a magnetic chip separator.

In sliding gear transmissions, particularly those which are not synchronized in all shift positions, small metal chips are broken off the gears during hard usage. These metal chips are carried by the transmission lubricating oil, and some of these chips become trapped in the bearing raceways resulting in noisy transmission operation and eventual bearing failure. Various arrangements have been tried to trap the chips, such as the use of chip traps, galleries with strainers and magnets and magnetic drain plugs located at the bottom of the transmission. In accordance with this invention we propose to design the transmission casing with rounded corners so that the centrifugal flow of oil, from at least some of the main gears, is turned within the transmission housing in a gradual manner to provide a smooth and nonturbulant flow of lubricating oil within the transmission housing, having a generally higher rate of flow adjacent to the gears and along the inner wall of the transmission housing and providing a low flow zone or a vortex center. This vortex center is within the transmission housing where the flow is at a much slower rate and thus the foreign matter collects at this center. The center is located near the lower portion of the transmission housing and spaced from the gears. A ceramic magnet having a large area and a limited magnetic field is positioned in the transmission housing so the field is coextensive with a major portion of the vortex center and does not pass through any transmisison gears.

An object of the invention is to provide a transmission having a magnet having a large surface area located in the casing having its magnetic field extending into an area of low flow of the lubricating fluid and not intercepting any transmission gears.

Another object of the invention is to provide in a transmission, a transmission and gearing structure arranged so that the normal pattern of lubrication fluid flow within the transmission casing provides a smooth nonturbulent and low speed flow having a zone or vortex center of lowest flow and placing a large area magnet in a position so that the magnetic field of the magnet intercepts a substantial area of the vortex center, and has a sufficient area to collect chips throughout the life of the transmission.

These and other objects of the invention will be more apparent from the following description and drawing of the preferred embodiment of the invention.

FIGURE 1 is a partial sectional view on the line 1—1 of FIGURE 3 of a transmission employing the invention.

FIGURE 2 is a partial sectional view of the transmission on the line 2—2 of FIGURE 3.

FIGURE 3 is an end view of the transmission with parts broken away and in section to show details.

FIGURE 4 shows the ceramic magnet.

The invention is illustrated in a sliding gear transmission having an input shaft 9 rotatably mounted in the housing 16 by bearing 10 and driving an input gear 11 which meshes with the driven countershaft gear 12 fixed to the countershaft 13 rotatably mounted by suitable bearings 14 and 15 in the transmission housing 16. The countershaft 13 also has fixed thereto a reverse gear 17, a third speed gear 18, a second speed gear 19 and a first speed gear 21. The second and third speed countershaft gears 19 and 18 are respectively in constant mesh with the second speed output gear 22 and the third speed output gear 23 which are rotatably mounted on the output shaft 24. The first speed output gear 26 is slidably mounted on a splined portion 27 of the output shaft 24, which is rotatably mounted at the rear end by the bearing 28, and at the forward end by bearings, not shown, in a bore in the input shaft 9. The synchromesh unit 32 is moved forwardly in the conventional manner to directly connect the input shaft 9 to the output shaft 24 to provide fourth speed and move rearwardly to connect the third speed output gear 23 to the output shaft 24 to provide third speed. The first speed output gear 26 is moved forwardly and may have synchronizing elements thereon to connect the second speed output gear 22 to the output shaft 24 and moved rearwardly to mesh with the first speed countershaft gear 21 and connected by the gear 26 to the output shaft 24 for first speed drive. The reverse countershaft 36 is rotatably mounted in suitable bearings 37 and 38 in the transmission housing and has gears 41 and 42 mounted on a collar 43 which is shiftable so that gear 42 engages gear 17 and gear 41 engages gear 26 to provide reverse drive.

The transmission housing, as shown in the drawings, has a conventional drain plug 51, and a generally rounded shape, to provide a smooth and regular nonturbulent flow of lubricant fluid within the casing or transmission housing when the oil is circulated by the centrifugal action of the rotating gears which throw oil radially from the side wall surfaces. The casing is well rounded at the corners, as at 52, so that the flow of oil from at least one side of the transmission gear 12 impinges on a rounded surface and initially starts in a general smooth flow along the interior of the transmission housing wall toward the rear or output end of the transmission. This rounding at 52 is most important since countershaft gear 12 has a large diameter and rotates proportional to engine speed and thus provides a large flow of oil. The transmission is similarly rounded at 53 at the rear end of the transmission, but there is a smaller flow of oil from the slower speed and smaller diameter first speed gears. It will also be noted that the side walls of the transmission housing 56 and 57 are rounded so that they, in general, are a uniform distance from the gearing to further insure more uniform lubrication flow without turbulence within the transmission housing. The rounding of the interior wall, preferably at the corners but also at other interior wall surface portions so that the centrifugal flow in a radial direction strikes the rounded surface and flows longitudinally along the inner wall surface of the transmission, prevents stratification of the oil flow in transverse zones within the transmission so that all the oil in the transmission housing eventually flows through the low flow rate zone or vortex center. It is generally believed that this flow is from the forward end of the housing adjacent gears 11 and 12 toward the rear of the housing in a zone near the inner surface of the wall with a return flow inside the last mentioned flow. There may also be a rear flow at the rear of the transmission in an oposite direction. Where these flows meet at the same head which would be nearer the rear wall since the rear flow has a lower head there will be a vortex center collecting foreign matter and vortex flow inwardly to provide the return flow.

Through the design considerations for providing vortex flow with a vortex center in a complex of transmission gearing are very complex, they may be readily checked by inserting opposed transparent walls and putting chips in the oil. Where vortex flow is established, the chips will collect quickly at the vortex center and be visible when the oil in the transmisison is illuminated.

In the lower portion of the casing there is a small recess 58 in which the hard ceramic magnet 59 is glued or cemented preferably with a solvent release type rubber base cement. The permanent magnet has a size and shape so that it can efficiently attract and hold, under all normal conditions, the maximum quantity of chips expected to be found in the transmission during the life of the transmission. This has been found to be approximately 5 grams for a standard truck-type four speed transmission disclosed herein. Preferably a short cylindrical or thin disc magnet is employed so that the surface area on the circular top which collects the chips is at least five times the volume of the magnet. It is also found that the hard ceramic magnet or ferrite magnet of the barium carbonate and iron oxide type, i.e., $BaO.6Fe_2O_3$ are more effective in this use since a larger surface area can be more easily and cheaply provided. Other ceramic magnets of ferromagnetic oxides disclosed in Patent 2,762,777 Went et al. and 2,762,778 Gorter et al. may be used. The ferrite may be held together by sintering or bonding with rubber. Also, a magnet of the ceramic type, having the capacity to hold the quantity of chips involved in a transmission, does not have such a large field that the field would pass through the transmission gearing. We prefer to use the isotropic type ceramic magnet which is nonoriented and provide sufficient magnetic force for this use. The magnet is located so that its field 61 intercepts a major portion of the vortex center of fluid flow and does not intercept any transmission gears or shafts. The magnet has sufficient strength to attract chips and move them from the vortex center and hold them on the magnet against the force exerted by the oil when hot or cold, tending to move the chips off the magnet. These low strength nonoriented hard ferrite magnets having a large area, a magnetic field extending a small distance from this area as compared to alnico magnets, provides the most efficient chip collector.

It will be appreciated that this invention may be modified within the scope of the appended claims.

I claim:

1. In a gearing mechanism, a housing, a plurality of intermeshing gears rotatably mounted in said housing, said housing having an interior wall closely and uniformly spaced from the axes of said gears, at least one of said gears rotating in lubricant and centrifuging lubricant radially outward from the axis of rotation of said one gear to create a radial flow of lubricant, said housing having means to receive said radial lubricant flow and turn it to an axial direction to provide vortex flow in said housing having a vortex center spaced from said gears, a magnet located in said housing having a field spaced from said gears and coextensive with a part of said vortex center and having sufficient strength to draw chips from said vortex center to said magnet.

2. In a gearing mechanism, a housing, a plurality of intermeshing gears rotatably mounted in said housing, said housing having an interior wall closely and uniformly spaced from the axes of said gears, at least one of said gears rotating in lubricant and centrifuging lubricant radially outward from the axis of rotation of said one gear to create a radial flow of lubricant, said housing having means to receive said radial lubricant flow and turn it to an axial direction to provide vortex flow in said housing having a vortex center spaced from said gears, a ceramic magnet located in said housing having a field spaced from said gear and coextensive with a part of said vortex center and having sufficient strength to draw chips from said vortex center to said magnet.

3. In a gearing mechanism, a housing, a plurality of intermeshing gears rotatably mounted in said housing, said housing having an interior wall closely and uniformly spaced from the axes of said gears, at least one of said gears rotating in lubricant and centrifuging lubricant radially outward from the axis of rotation of said one gear to create a radial flow of lubricant, said housing having means to receive said radial lubricant flow and turn it to an axial direction to provide vortex flow in said housing having a vortex center spaced from said gears, a ceramic magnet located in said housing having a limited field spaced from said gears and coextensive with a part of said vortex center and having sufficient strength to draw chips from said vortex center to said magnet.

4. In a gearing mechanism, a housing, a plurality of intermeshing gears rotatably mounted in said housing, said housing having an interior wall closely and uniformly spaced from the axes of said gears, at least one of said gears rotating in lubricant and centrifuging lubricant radially outward from the axis of rotation of said one gear to create a radial flow of lubricant, said housing having means to receive said radial lubricant flow and turn it to an axial direction to provide vortex flow in said housing having a vortex center spaced from said gears, a ceramic magnet located in said housing having a field spaced from said gears and coextensive with a part of said vortex center and having sufficient strength to draw chips from said vortex center to said magnet and having sufficient area to hold the quantity of chips accumulated during the life of the transmission.

5. In a gearing mechanism, a housing, a plurality of intermeshing gears rotatably mounted in said housing, said housing having an interior wall closely and uniformly spaced from the axes of said gears, at least one of said gears rotating in lubricant and centrifuging lubricant radially outward from the axis of rotation of said one gear to create a radial flow of lubricant, said housing having means to receive said radial lubricant flow and turn it to an axial direction to provide vortex flow in said housing having a vortex center spaced from said gears, a ceramic magnet of the barium oxide and magnetic iron oxide type located in said housing having a field spaced from said gears and coextensive with a part of said vortex center and having sufficient strength to draw chips from said vortex center to said magnet and having sufficient area to hold the quantity of chips accumulated during the life of the transmission.

6. In a gearing mechanism, a housing, a plurality of intermeshing gears rotatably mounted in said housing, said housing having an interior wall closely and uniformly spaced from the axes of said gears, at least two gears rotating in lubricant and centrifuging lubricant radially outward from the axis of rotation of said gears to create a plurality of radial flows of lubricant, said housing having means to receive at least two said radial lubricant flows and turn them into opposed axial directions to provide vortex flow in said housing having a vortex center spaced from said gears, a ceramic magnet located in said housing having a field spaced from said gears and coextensive with a part of said vortex center and having sufficient strength to draw chips from said vortex center to said magnet.

7. In a transmission of the sliding gear type, a multi-ratio gear unit having a plurality of gears providing a plurality of ratios located in a transmission housing, said transmission housing having a rounded internal corner, one of said gears being in transverse alignment with said rounded corner so that the lubricating oil is centrifugally thrown from said gear to impinge on said one rounded corner to provide a longitudinal circulation of flow around the perimeter of said housing having a vortex center at a position inside said perimeter, and a magnet located on the inner wall of said transmission housing having a field intercepting said vortex center and of sufficient strength to draw particles of metal from the lubricating fluid and hold them on the magnet.

8. In a transmission of the sliding gear type, a multi-ratio gear unit having a plurality of gears providing a plurality or ratios located in a transmission housing, said transmission housing having a rounded internal corner, at least one of said gears being in transverse alignment with said rounded corner so that the lubricating oil is centrifugally thrown from said gear to impinge on said one rounded corner to provide a longitudinal circulation of flow around the perimeter of said housing having a vortex center at a portion inside said perimeter, a magnet located on the inner wall of said transmission housing having a field intercepting said vortex center and of sufficient strength to draw particles of metal from the lubricating fluid and hold them on the magnet, and said gears not intercepting said magnetic field.

9. In a transmission of the sliding gear type, a multi-ratio gear unit having a plurality of gears providing a plurality of ratios located in a transmission housing, said transmission housing having a rounded internal corner, at least one of said gears being in transverse alignment with said rounded corner so that the lubricating oil is centrifugally thrown from said gear to impinge on said one rounded corner to provide a longitudinal circulation of flow around the perimeter of said housing having a vortex center at a portion inside said perimeter, a ceramic magnet located on the inner wall of said transmission housing having a field intercepting said vortex center and of sufficient strength to draw particles of metal from the lubricating fluid and hold them on the magnet and to retain all the chips which would be produced during the life of the transmission, and said gears not intercepting said magnetic field.

10. In a transmission of the sliding gear type, a multi-ratio gear unit having a plurality of gears providing a plurality of ratios located in a transmission housing, said transmission housing being substantially uniformly spaced from the axis of said transmission gears and having rounded internal corners, at least one of said gears being in transverse alignment with said rounded corner so that the lubricating oil is centrifugally thrown from said gear to impinge on said one rounded corner to provide a longitudinal circulation of flow around the perimeter of said housing having a vortex center at a portion inside said perimeter, a ceramic magnet located on the inner wall of said transmission housing having a field intercepting said vortex center and of sufficient strength to draw particles of metal from the lubricating fluid and hold them on the magnet and having sufficient area to retain all the chips which would be produced during the life of the transmission, and said gears not intercepting said magnetic field.

11. In a gearing mechanism, a housing, a plurality of intermeshing gears rotatably mounted in said housing, said housing having an interior wall surface spaced from said gears and a vortex center within said housing, at least one of said gears rotating in lubricant and centrifuging lubricant radially outward from the axis of rotation of said one gear to create a radial flow of lubricant, said housing having means to receive said radial lubricant flow and turn it to provide lubricant flow adjacent said interior wall surface toward said vortex center to form a still vortex about said vortex center and vortex flow away from said vortex center toward the center of said housing, said vortex center being spaced from said gears, a magnet located in said housing having a field spaced from said gears and coextensive with a part of said vortex center and having sufficient strength to draw chips from said vortex center to said magnet.

12. In a gearing mechanism, a housing providing a chamber adapted to contain lubricant, a plurality of intermeshing gears rotatably mounted in said housing, said gears and housing including means for moving the lubricant about the said chamber in a flow path at a higher velocity and means for guiding the flow path to provide a high velocity curved flow path flowing around a lower velocity flow zone, and magnet means located in said lower velocity flow zone of said chamber.

13. The invention defined in claim 12 and said magnet means having a plate shape with a surface area on one side for the collection of chips at least five times the volume of said magnet and having a magnetic field providing sufficient magnetic force in said field to attract metal particles from said lubricant in said magnetic field and sufficient area on the surface of the magnet and volume of magnetic field to collect and retain well within said magnetic field substantially all the chips normally formed during the life of said gears.

14. The invention defined in claim 12 and said magnet means having a field spaced from said gears.

15. The invention defined in claim 12 and said magnet means being cemented to the interior wall of said housing.

16. The invention defined in claim 12 and said magnet means having a surface area for the collection of chips at least five times the volume of said magnet means.

17. The invention defined in claim 12 and said magnet means having sufficient magnetic force and area to attract and retain all the chips normally accumulated during the life of said gears.

18. The invention defined in claim 12 and said magnet means having a field spaced from said gears, said magnet means being cemented to the interior wall of said housing, said magnet means having a surface area on one side for the collection of chips at least five times the volume of said magnet and having sufficient magnetic force to attract metal particles from said lubricant and sufficient area to retain substantially all the chips normally formed during the life of said gears well within said magnetic field.

References Cited in the file of this patent
UNITED STATES PATENTS

| | | |
|---|---|---|
| 1,988,440 | Cotterman | Jan. 22, 1935 |
| 2,499,798 | Trail | Mar. 7, 1950 |
| 2,622,699 | Mills | Dec. 23, 1952 |
| 2,762,777 | Went et al. | Sept. 11, 1956 |
| 2,762,778 | Gorter et al. | Sept. 11, 1956 |
| 2,999,275 | Blume | Sept. 12, 1961 |